United States Patent
Tian et al.

(10) Patent No.: US 10,203,950 B2
(45) Date of Patent: Feb. 12, 2019

(54) METHOD FOR UPGRADING FIRMWARE OF ADAPTER, MOBILE TERMINAL, AND ADAPTER THEREOF

(71) Applicant: GUANGDONG OPPO MOBILE TELECOMMUNICATIONS CORP., LTD., Dongguan (CN)

(72) Inventors: Chen Tian, Dongguan (CN); Jialiang Zhang, Dongguan (CN); Jun Zhang, Dongguan (CN); Fuchun Liao, Dongguan (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 18 days.

(21) Appl. No.: 15/306,509

(22) PCT Filed: Sep. 24, 2015

(86) PCT No.: PCT/CN2015/090626
§ 371 (c)(1),
(2) Date: Oct. 25, 2016

(87) PCT Pub. No.: WO2017/049557
PCT Pub. Date: Mar. 30, 2017

(65) Prior Publication Data
US 2017/0277533 A1 Sep. 28, 2017

(51) Int. Cl.
*G06F 9/445* (2018.01)
*G06F 8/654* (2018.01)
(Continued)

(52) U.S. Cl.
CPC ............ *G06F 8/654* (2018.02); *G06F 8/61* (2013.01); *G06F 8/71* (2013.01); *H04L 41/082* (2013.01); *G06F 8/65* (2013.01)

(58) Field of Classification Search
CPC ..... G06F 8/65; G06F 8/68; G06F 8/61; G06F 8/67; G06F 8/71
See application file for complete search history.

(56) References Cited

U.S. PATENT DOCUMENTS

2004/0006703 A1 1/2004 Kitani
2007/0136611 A1 6/2007 Kitani et al.
(Continued)

FOREIGN PATENT DOCUMENTS

CN 102164113 A 9/2011
CN 102184113 A 9/2011
(Continued)

*Primary Examiner* — Chuck O Kendall
(74) *Attorney, Agent, or Firm* — Hodgson Russ LLP

(57) ABSTRACT

A method of upgrading firmware of an adapter includes transmitting a set of n data blocks of first upgrade file to the adapter, receiving a first response information of the adapter based on the set of n data blocks, and determining that the updating procedure of the adapter fails when the first response information indicates that the adapter fails to receive all of the n data blocks. In the method, a mobile terminal transmits the upgrade file to the adapter and the adapter sends determination information to the mobile terminal after the adapter receives the upgrade file having a predetermined size. In a time interval, if the mobile terminal fails to receive the determination information or the adapter does not receive the upgrade file, the upgrading firmware of the adapter fails.

18 Claims, 5 Drawing Sheets

(51) Int. Cl.
*G06F 8/61* (2018.01)
*H04L 12/24* (2006.01)
*G06F 8/71* (2018.01)
*G06F 8/65* (2018.01)

(56) References Cited

U.S. PATENT DOCUMENTS

2009/0327727 A1   12/2009  Meijer et al.
2012/0005497 A1*   1/2012  Tsukamoto ............. G06F 8/665
                                                            713/310
2015/0324186 A1*  11/2015  Shin ......................... G06F 8/71
                                                            717/170

FOREIGN PATENT DOCUMENTS

| CN | 103559066 A | 2/2014 |
| CN | 103685487 A | 3/2014 |
| EP | 2132898 A1 | 12/2009 |
| TW | 200307250 A | 12/2003 |

* cited by examiner

1

METHOD FOR UPGRADING FIRMWARE OF ADAPTER, MOBILE TERMINAL, AND ADAPTER THEREOF

CROSS REFERENCE TO RELATED APPLICATIONS

This application is a 371 application filing of PCT International application serial no. PCT/CN2015/090626, filed Sep. 24, 2015. The entire disclosure of the above application is incorporated herein by reference.

BACKGROUND

Field

The present disclosure relates to a technical field of communication, and more particularly to a method for upgrading firmware of an adapter, a mobile terminal, and the adapter thereof.

Background

An intelligent adapter is capable of adjusting its operation mode according to actual requirements. A main part of an adapter can be a microcontroller unit (MCU).

A smartphone can download upgrade file for the adapter for upgrading a firmware of the MCU in the adapter via a connection port of the smartphone. However, data transmission error likely occurs when data transfers between different components of the smartphone and the adapter via a long distance, thereby causing failure of upgrading the firmware of the MCU of the adapter, or even resulting in malfunction of the adapter.

SUMMARY OF THE DISCLOSURE

Based on the above-mentioned drawbacks, one objective of the present disclosure is to provide a method for upgrading firmware of an adapter, a mobile terminal, and the adapter thereof to improve accuracy and reliability of a data transmission of the adapter.

In a first aspect of a method for upgrading firmware of an adapter, the method includes transmitting, by a mobile terminal, a set of n data blocks of a first upgrade file to the adapter, where the first upgrade file is configured to upgrade the firmware of the adapter, and the number n is a positive integer either less than or equal to a total number of data blocks of the first upgrade file; receiving, by the mobile terminal, a first response information fed back from the adapter responsive to the data block transmission; and determining, by the mobile terminal, that upgrading the firmware of the adapter fails when the first response information fed back from the adapter indicates that the adapter fails to receive all of the set of n data blocks of the first upgrade file.

In at least one embodiment of the first aspect, after transmitting, by the mobile terminal, the set of n data blocks of the first upgrade file to the adapter, the method further includes determining, by the mobile terminal, that upgrading the firmware of the adapter fails when the mobile terminal does not receive the first response information in a first preset time interval.

In at least one embodiment of the first aspect, transmitting, by the mobile terminal, the set of n data blocks of the first upgrade file to the adapter includes transmitting, by the mobile terminal, the ith data block of the set of n data blocks to the adapter, where the number i is a positive integer less than the number n; and the method further includes continuously transmitting, by the mobile terminal, the (i+1)th data block to the adapter when the mobile terminal receives the first response fed back from the adapter responsive to the ith data block transmission, where the first response information is configured to indicate that the adapter receives the ith data block of the first upgrade file; and determining, by the mobile terminal, that upgrading the firmware of the adapter fails when the mobile terminal does not receive the first response information.

In at least one embodiment of the first aspect, when the first response information indicates that the adapter successfully receives all of the set of n data blocks, the method further includes, when the number n is a positive integer less than the total number of data blocks of the first upgrade file, continuously transmitting the remaining data blocks of the first upgrade file by the mobile terminal to the adapter; and, if the first upgrade file has been sent by the mobile terminal, sending a first indication information by the mobile terminal to the adapter.

In at least one embodiment of the first aspect, the method further includes sending, by the mobile terminal, a second response information to the adapter when the mobile terminal receives a set of m data blocks of a second upgrade file which is re-sent by the adapter responsive to the first indication information in a second preset time interval, where the second response information is configured to indicate that the mobile terminal has successfully received the set of m data blocks of the second upgrade file, and the second upgrade file is the same as the previous first upgrade file received by the adapter; or sending, by the mobile terminal, the second response information to the adapter when the mobile terminal determines that upgrading the firmware of the adapter fails in the second preset time interval, where the second response information is configured to indicate that the mobile terminal fails to receive all of the set of m data blocks of the second upgrade file, and the number m is a positive integer either less than or equal to a total number of data blocks of the second upgrade file.

In at least one embodiment of the first aspect, the method further includes sending, by the mobile terminal, the second response information to the adapter unless the mobile terminal has not received all of the set of m data blocks of the second upgrade file re-sent by the adapter responsive to the first indication information in the second preset time interval.

In at least one embodiment of the first aspect, the number m is equal to one.

In at least one embodiment of the first aspect, the method further includes comparing, by the mobile terminal, the second upgrade file with the first upgrade file; and sending, by the mobile terminal, the second indication information to the adapter; where if the second upgrade file is the same as the first upgrade file, the second indication information is configured to indicate that upgrading the firmware of the adapter has been completed, and if the second upgrade file differs from the first upgrade file, the second indication information is configured to indicate that upgrading the firmware of the adapter fails.

In at least one embodiment of the first aspect, before comparing, by the mobile terminal, the second upgrade file and the first upgrade file, the method further includes receiving, by the mobile terminal, a third indication information which is sent by the adapter, where the third indication information indicates that the adapter has transmitted the second upgrade file.

In at least one embodiment of the first aspect, the method further includes re-transmitting, by the mobile terminal, the first upgrade file to the adapter if the mobile terminal determines that upgrading the firmware of the adapter fails.

In at least one embodiment of the first aspect, before the mobile terminal transmits the first upgrade file to the adapter, the method further includes receiving, by the mobile terminal, a version information fed back from the adapter; comparing, by the mobile terminal, the version information with a latest version information prestored in the mobile terminal; when the version information fed back from the adapter is lower than the latest version information prestored in the mobile terminal, the mobile terminal sends an upgrading indication information to the adapter to get ready for receiving the first upgrade file.

In a second aspect of a method for upgrading firmware of an adapter, the method includes receiving, by the adapter, a set of n data blocks of a first upgrade file transmitted by a mobile terminal, where the first upgrade file is configured to upgrade the firmware of the adapter, and the number n is a positive integer either less than or equal to a total number of data blocks of the first upgrade file; and transmitting, by the adapter, a first response information to the mobile terminal responsive to receipt of the set of n data blocks, where the first response information indicates that the adapter has successfully received the set of n data blocks.

In at least one embodiment of the second aspect, the method further includes sending, by the adapter, the first response information to the mobile terminal, and determining, by the adapter, that upgrading the firmware of the adapter fails unless the adapter has not received data blocks of the first upgrade file in a first preset time interval.

In at least one embodiment of the second aspect, the method further includes receiving, by the adapter, a first indication information fed back from the mobile terminal, where the first indication information indicates that the first upgrade file has been sent by the mobile terminal completely; transmitting, by the adapter, a set of m data blocks of second upgrade file to the mobile terminal, where the second upgrade file is the first upgrade file which is transmitted from the mobile terminal to the adapter, and the number m is a positive integer either less than or equal to a total number of data blocks of the second upgrade file; receiving, by the adapter, a second response information fed back from the mobile terminal responsive to the transmission of the set of m data blocks; and determining, by the adapter, that upgrading the firmware of the adapter fails if the second response information fed back from the mobile terminal indicates that the mobile terminal fails to receive all of the set of n data blocks.

In at least one embodiment of the second aspect, the method further includes determining, by the adapter, that upgrading the firmware of the adapter fails when the adapter transmits the set of m data blocks to the mobile terminal in a second preset time interval and the adapter fails to receive the second response information.

In at least one embodiment of the second aspect, the second response information indicates that the mobile terminal has successfully received the set of m data blocks, and the method further includes, if the second upgrade file includes remaining data blocks, continuously transmitting the remaining data blocks of the second upgrade file by the adapter to the mobile terminal; and, if the second upgrade file has been completely sent by the adapter, transmitting third indication information by the adapter to the mobile terminal, where the third indication information indicates that the adapter has completely sent the second upgrade file.

In at least one embodiment of the second aspect, the method further includes receiving, by the adapter, a second indication information transmitted by the mobile terminal based on the second upgrade file, where the second indication information indicates that upgrading the firmware of the adapter either fails or succeeds.

In at least one embodiment of the second aspect, the method further includes, if upgrading the firmware of the adapter fails, cancelling the received data blocks of the first upgrade file.

In at least one embodiment of the second aspect, before the adapter receives the first upgrade file transmitted by the mobile terminal, the method further includes transmitting, by the adapter, a version information to the mobile terminal, where the version information indicates a current version of the adapter; and receiving, by the adapter, updating indication information fed back from the mobile terminal, where the updating indication information indicates a need to upgrade firmware of the adapter.

In a third aspect, the mobile terminal includes a transmitting/receiving unit configured to transmit a set of n data blocks of first upgrade file to an adapter, where the first upgrade file is configured to upgrade firmware of the adapter, and the number n is a positive integer either less than or equal to a total number of data blocks of the first upgrade file, where the transmitting/receiving unit includes a processor that is electrically coupled to the adapter; the transmitting/receiving unit being further configured to receive a first response information fed back from the adapter responsive to the data block transmission; and a determination unit configured to determine that upgrading the firmware of the adapter fails when the first response information fed back from the adapter indicates that the adapter fails to receive all of the set of n data blocks of the first upgrade file.

In at least one embodiment of the third aspect, the determination unit is further configured to determine that upgrading the firmware of the adapter fails when the mobile terminal does not receive the first response information in a first preset time interval after the transmitting/receiving unit transmits the set of n data blocks of the first upgrade file to the adapter.

In at least one embodiment of the third aspect, the transmitting/receiving unit is configured to transmit the ith data block of the set of n data blocks to the adapter, where the number i is a positive integer less than the number n; and the transmitting/receiving unit is further configured to continuously transmit the (i+1)th data block to the adapter when the mobile terminal receives the first response information fed back from the adapter responsive to the ith data block transmission, where the determination unit determines that upgrading the firmware of the adapter fails when the determination unit does not receive the first response information fed back from the adapter responsive to the ith data block transmission.

In at least one embodiment of the third aspect, when the first response information indicates that the adapter successfully receives all of the set of n data blocks, the transmitting/receiving unit is further configured to continuously transmit the remaining data blocks of the first upgrade file to the adapter if the determination unit determines that the first upgrade file includes remaining data blocks; and send first indication information to the adapter if the determination unit determines that the first upgrade file has been sent, where the first indication information indicates that the mobile terminal completely transmits the first upgrade file.

In at least one embodiment of the third aspect, the transmitting/receiving unit is configured to either send a second response information to the adapter when a set of m data blocks of a second upgrade file, which is re-sent by the adapter responsive to the first indication information in a second preset time interval, are received, where the second response information is configured to indicate that the mobile terminal has successfully received the set of m data blocks, and the second upgrade file is the same as the previous first upgrade file received by the adapter; or send the second response information to the adapter and determine, by the determination unit, that upgrading the firmware of the adapter fails when all of the set of m data blocks of the second upgrade file which are transmitted by the adapter based on the first indication information in the second preset time interval are not received, where the second response information is configured to indicate that the mobile terminal fails to receive all of the set of m data blocks, and the number in is a positive integer either less than or equal to a total number of data Hocks of the second upgrade file.

In at least one embodiment of the third aspect, the transmitting/receiving unit is configured to send the second response information to the adapter unless all of the set of m data blocks of the second upgrade file resent by the adapter responsive to the first indication information in the second preset time interval has not been received.

In at least one embodiment of the third aspect, the number m is equal to one.

In at least one embodiment of the third aspect, the determination unit is further configured to compare the second upgrade file with the first upgrade file; and the transmitting/receiving unit is configured to send the second indication information to the adapter, where if the second upgrade file is the same as the first upgrade file, the second indication information is configured to indicate that upgrading the firmware of the adapter has been completed, and if the second upgrade file differs from the first upgrade file, the second indication information is configured to indicate that upgrading the firmware of the adapter fails.

In at least one embodiment of the third aspect, before the determination. unit compares the second upgrade file with the first upgrade file, the transmitting/receiving unit is further configured to receive a third indication information which is sent by the adapter, where the third indication information indicates that the adapter completely transmits the second upgrade file.

In at least one embodiment of the third aspect, the transmitting/receiving unit is configured to re-transmit the first upgrade file to the adapter if the determination unit determines that upgrading the firmware of the adapter fails.

In at least one embodiment of the third aspect, the transmitting/receiving unit is configured to receive a version information fed back from the adapter before the first upgrade file is transmitted to the adapter; the determination unit is configured to compare the version information with a latest version information; and when the version information fed back from the adapter is lower than the latest version information prestored in the transmitting/receiving unit, the transmitting/receiving unit sends an upgrading indication information to the adapter to get ready for receiving the first upgrade file.

in a fourth aspect, the adapter includes a transmitting/receiving unit configured to receive a set of n data blocks of first upgrade file transmitted by a mobile terminal, where the first upgrade file is configured to upgrade firmware of the adapter, and the number n is a positive integer either less than or equal to a total number of data blocks of the first upgrade file; and the transmitting/receiving unit is further configured to transmit a first response information to the mobile terminal responsive to receipt of the set of n data blocks, where the first response information indicates that the adapter has successfully received the set of n data blocks.

In at least one embodiment of the fourth aspect, the adapter further includes a determination unit configured to send the first response information to the mobile terminal, and determine that upgrading the firmware of the adapter fails unless the transmitting/receiving unit has not received data blocks of the first upgrade file in a first preset time interval.

In at least one embodiment of the fourth aspect, the transmitting/receiving unit is further configured to receive a first indication information fed back from the mobile terminal, where the first indication information indicates that the first upgrade file has been sent by the mobile terminal completely; transmit a set of m data blocks of second upgrade file to the mobile terminal, where the second upgrade file is the first upgrade file which is transmitted from the mobile terminal to the adapter, and the number m is a positive integer either less than or equal to a total number of data blocks of the second upgrade file; receive a second response information fed back from the mobile terminal responsive to the transmission of the set of m data blocks; and the determination unit is configured to determine that upgrading the firmware of the adapter fails if the second response information fed back from the mobile terminal indicates that the mobile terminal fails to receive all of the set of n data blocks.

In at least one embodiment of the fourth aspect, the determination unit is configured to determine that upgrading the firmware of the adapter fails when the adapter transmits the set of m data blocks to the mobile terminal in a second preset time interval and the transmitting/receiving unit fails to receive the second response information.

In at least one embodiment of the fourth aspect, the second response information indicates that the mobile terminal has successfully received the set of m data blocks, and the transmitting/receiving unit is configured to continuously send remaining data blocks of the second upgrade file to the mobile terminal if the determination unit determines that the second upgrade file includes the remaining data blocks; and transmit third indication information to the mobile terminal if the determination unit determines the second upgrade file has been completely sent by the adapter, where the third indication information indicates that the adapter has completely sent the second upgrade file.

In at least one embodiment of the fourth aspect, the transmitting/receiving unit is configured to receive a second indication information transmitted by the mobile terminal based on the second upgrade file, where the second indication information indicates that upgrading the firmware of the adapter either fails or succeeds.

In at least one embodiment of the fourth aspect, the determination unit is further configured to cancel received data blocks of the first upgrade file if upgrading the firmware of the adapter fails.

In at least one embodiment of the fourth aspect, the transmitting/receiving unit is configured to transmit a version information to the mobile terminal before the first upgrade file transmitted by the mobile terminal is received, where the version information indicates a current version of the adapter; and receive upgrading indication information fed back from the mobile terminal, where the upgrading indication information indicates a need to upgrade firmware of the adapter.

Based on the above aspects of the method for upgrading firmware of the adapter, mobile terminal, and adapter of the present disclosure, the adapter transmits a response information to the mobile terminal after the mobile terminal transmits the upgrade file to the adapter and the adapter receives the upgrade file having the predetermined size. When the adapter does not receive the upgrade file and the mobile terminal does not receive the response information, upgrading the firmware of the adapter fails and the mobile terminal re-sends the upgrade file. Moreover, after the mobile terminal transmits the upgrade file to the adapter, the adapter re-transmits the received upgrade file to the mobile terminal and the mobile terminal compares the received upgrade file and the transmitted upgrade file to determine whether the upgrade file is correctly transmitted. If the upgrade file is incorrect, the mobile terminal re-sends the upgrade file. Therefore, a data transmission error resulting in malfunction of the adapter can be avoided when performing upgrading the firmware of the adapter such that the accuracy and reliability of a data transmission are improved when the mobile terminal transmits data to the adapter.

BRIEF DESCRIPTION OF THE DRAWINGS

To describe the technical solutions of the present application more clearly, the accompanying drawings for illustrating at least one embodiment will be introduced briefly in the following. Apparently, the accompanying drawings in the following description are only some embodiments of the present application, and a person of ordinary skill in the art may obtain other drawings based on these accompanying drawings without creative efforts.

DETAILED DESCRIPTION OF THE PREFERRED EMBODIMENTS

The following embodiments refer to the accompanying drawings for exemplifying specific implementable embodiments of the present disclosure. It should be noted that the exemplary described embodiments are configured to describe and understand the present disclosure, but the present disclosure is not limited thereto.

Figure 1:
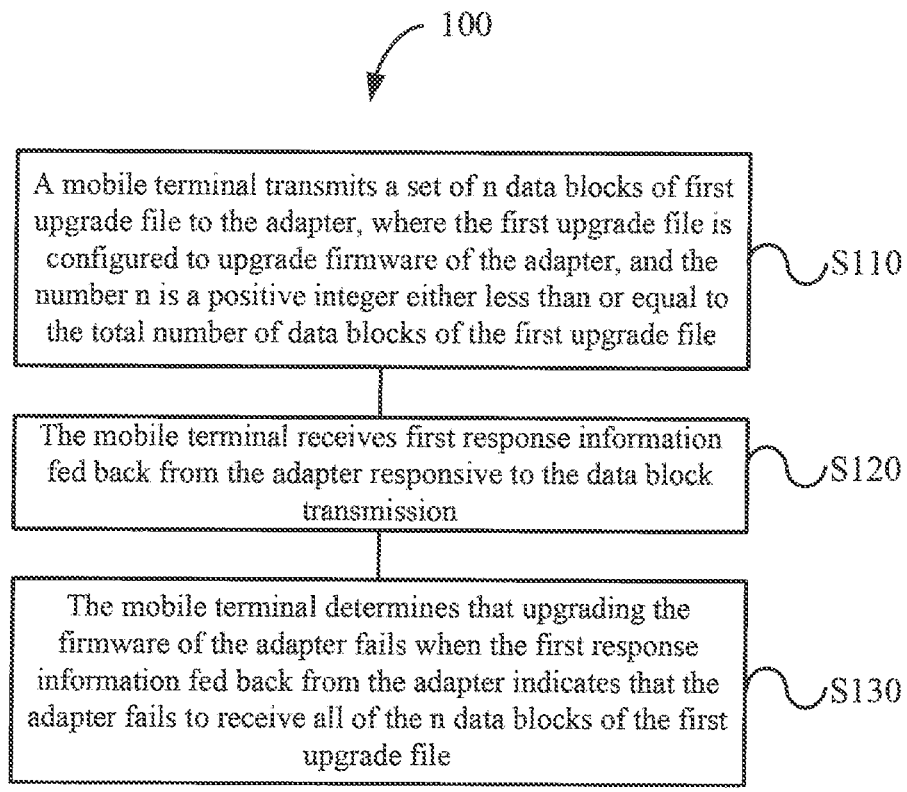
FIG. 1 is an illustrative flowchart of a method for upgrading firmware of an adapter according to one embodiment of the present disclosure.

FIG. 1 is an illustrative flowchart of a method 100 for upgrading firmware of the adapter according to one embodiment of the present disclosure. A mobile terminal, such as a smartphone, performs the method 100. As illustrated in FIG. 1, the method 100 includes the following blocks.

In block S110, the mobile terminal transmits a set of n data blocks of first upgrade file to the adapter, where the first upgrade file is configured to upgrade firmware of the adapter, and the number n is a positive integer either less than or equal to the total number of data blocks of the first upgrade file.

In block S120, the mobile terminal receives the first response information fed back from the adapter responsive to the data block transmission.

In block S130, the mobile terminal determines that upgrading the firmware of the adapter fails when the first response information fed back from the adapter indicates that the adapter fails to receive all of the n data blocks of the first upgrade file.

In detail, the mobile terminal transmits a first upgrade file to the adapter to upgrade firmware of the adapter. When the adapter receives the first upgrade file having a predetermined size, for example, when the adapter receives the set of n data blocks of first upgrade file, the adapter transmits the first response information to the mobile terminal. When the mobile terminal determines that the adapter has successfully received all of the set of n data blocks responsive to the first response information, the mobile terminal continuously transmits remaining data blocks of the first upgrade file to the adapter. The adapter can skip transmitting the first response information to the mobile terminal and determine that upgrading the firmware of the adapter fails when the adapter does not receive data blocks of the first upgrade file in a preset time interval, and the adapter can cancel received data blocks of the first upgrade file. The mobile terminal can stop transmitting the remaining data blocks of the first upgrade file to the adapter and determine that upgrading the firmware of the adapter fails when the first response information received by the mobile terminal indicates that the adapter does not receive all of the set of n data blocks in a first preset time interval.

Thus, while upgrading the firmware of the adapter, after the mobile terminal transmits the upgrade file to the adapter and the adapter receives the upgrade file having a predetermined size, the adapter transmits determination information (e.g., response information) to the mobile terminal. When the adapter does not receive the upgrade file and the mobile terminal does not receive the determination information, upgrading the firmware of the adapter fails and the mobile terminal re-transmits the upgrade file to the adapter so that a data transmission error resulting in malfunction of the adapter is avoided when performing upgrading the firmware of the adapter. Therefore, the accuracy and reliability of a data transmission are improved when the mobile terminal transmits data to the adapter.

It can be understood that, in an embodiment of the present disclosure, the adapter includes an MCU and the MCU can be coupled to an MCU of the mobile terminal. For example, the mobile terminal (e.g., a smartphone) downloads data to the adapter via a connection port of the smartphone to upgrade the firmware of the MCU in the adapter.

In block S110, the mobile terminal transmits set of n data blocks of first upgrade file to the adapter, where the first upgrade file is configured to upgrade firmware of the adapter. In at least one embodiment, the mobile terminal is capable of comparing version information of the adapter to determine whether the adapter should be upgraded or not. If the adapter should be upgraded, the mobile terminal transmits the upgrade file to the adapter.

In detail, When the adapter makes a communication with the mobile terminal, the adapter transmits the version information indicating a current version of adapter to the mobile terminal. The mobile terminal compares the version information with prestored version information, where the prestored version information is the latest version of the adapter stored in the mobile terminal. If the version information fed back from the adapter is lower than the prestored version information, the mobile terminal transmits updating indication information to the adapter to get ready for receiving the first upgrade file. The adapter prepares to be upgraded on the basis of the updating indication information by receiving the upgrade file transmitted from the mobile terminal.

For example, the version information may be a version number and the adapter transmits a current version number to the mobile terminal, where the prestored version information in the mobile terminal is the latest version number stored in the mobile terminal. If the current version number of adapter is lower than the latest version number, it is required to upgrade firmware of the adapter.

In block S120, the mobile terminal receives the first response information responsive to the data block transmission of the set of n data blocks. In block S130, the mobile terminal determines that upgrading the firmware of the adapter fails when the first response information indicates that the adapter does not receive all of the set of n data blocks. In detail, the mobile terminal transmits the set of n data blocks to the adapter. If the adapter receives all of the set of n data blocks, the adapter transmits the first response information to the mobile terminal where the first response information indicates that the adapter has successfully received all of the set of n data blocks. Thus, responsive to the first response information, the mobile terminal determines that the mobile terminal has successfully sent the data blocks to the adapter and continuously transmits the rest of data blocks. If the adapter does not receive all of the set of n data blocks, the adapter transmits the first response information to the mobile terminal where the first response information indicates that the adapter does not receive all of the set of n data blocks. Therefore, the mobile terminal determines that upgrading the firmware of the adapter fails and stops transmitting the rest of data blocks.

In at least one embodiment, a timer is disposed in the mobile terminal. The mobile terminal determines that upgrading the firmware of the adapter fails since the adapter does not receive the data blocks of first upgrade file when the mobile terminal does not receive the first response information in a first preset time interval based on the timer.

In at least one embodiment, the mobile terminal transmits a set of n data blocks to the adapter, where the number n is a positive integer either less than or equal to the number of data blocks of the first upgrade file. For example, if n is equal to one, the mobile terminal transmits the set of n data blocks of the first upgrade file one by one. When the mobile terminal receives the first response information corresponding to each of data blocks, the mobile terminal continuously transmits a next data block, in another example, if n is equal to three, the mobile terminal transmits the set of n data blocks of the first upgrade file in three data blocks per unit, where the first response information transmitted by the adapter is capable of indicating whether the adapter receives the three data blocks per unit. For example, either one piece of first response information indicates the reception of three data blocks or three pieces of first response information indicate the receptions of three data blocks respectively, but not limited.

In at least one embodiment, the mobile terminal transmits the set of n data blocks to the adapter, where the number n is a positive integer either less than or equal to the number of data blocks of the first upgrade file, and a size of each data block can be set according to actual circumstances. For example, one byte or a plurality of bytes can be defined as the size of each data block. If the size of each data block is one byte, the mobile terminal waits for the first response information having the one byte from the adapter after transmitting every one data block having one byte to the adapter. If the mobile terminal receives the first response information in the preset time interval, the mobile terminal continuously transmits remaining data blocks to the adapter. If the mobile terminal does not receive the first response information in the preset time interval, the mobile terminal determines that upgrading the firmware of the adapter fails and stops transmitting the data blocks. In another example, if the size of each data block is still one byte, the mobile terminal waits for the first response information from the adapter after transmitting a plurality of data blocks (i.e., a plurality of bytes) to the adapter. The mobile terminal determines that upgrading the firmware of the adapter fails either if the mobile terminal does not receive the first response information from the adapter or if the mobile terminal receives the first response information which indicates that the adapter does not receive all of the bytes of data blocks. If the mobile terminal receives the first response information from the adapter and the first response information received by the mobile terminal indicates that the adapter receives all of the bytes of data blocks, the mobile terminal continuously transmits the remaining data blocks to the adapter.

In at least one embodiment, when the mobile terminal determines that upgrading the firmware of the adapter fails, the mobile terminal does not transmit the first upgrade file to the adapter and the adapter does not receive the first upgrade file in the preset time interval so that the adapter will exit upgrading the firmware to stop operating upgrading the firmware at this time. Thus, the adapter waits to receive new upgrade file re-transmitted by the mobile terminal to perform a new updating procedure. For example, after exiting upgrading the firmware, the adapter can cancel the received first upgrade file which is a portion of all of the upgrade file.

In at least one embodiment, when the mobile terminal determines that the adapter receives a set of n data blocks of first upgrade file, the mobile terminal continuously transmits the remaining data blocks of first upgrade file to the adapter until the mobile terminal transmits all of the remaining data blocks which means that the mobile terminal completely transmits the first upgrade file. In detail, when the mobile terminal continuously transmits data blocks of first upgrade file to the adapter and the mobile terminal receives the first response information of the adapter, which indicates that the adapter has successfully received the data blocks, the mobile terminal transmits first indication information to the adapter while the mobile terminal completely transmits the first upgrade file to the adapter, where the first indication information means that the mobile terminal has completely transmitted the first upgrade file. If the adapter receives the first indication information, the adapter transmits second upgrade file to the mobile terminal, where the second upgrade file is the received first upgrade file. The mobile terminal compares the second upgrade file with the first upgrade file to determine whether the adapter correctly receives the upgrade file.

In at least one embodiment, the adapter transmits a set of m data blocks of second upgrade file responsive to first indication information. The mobile terminal transmits second response information to the adapter when the mobile terminal receives the set of m data blocks of second upgrade file, which are transmitted by the adapter, responsive to the first indication information in a second preset time interval, where the second response information is configured to indicate that the mobile terminal has successfully received the set of m data blocks, and the second upgrade file is the same as the previous first upgrade file received by the adapter. The mobile terminal transmits the second response information to the adapter and determines that upgrading the firmware of the adapter fails when the mobile terminal does not receive all of the set of m data blocks (e.g., only a portion of the set of m data blocks) of the second upgrade file, which are transmitted by the adapter, responsive to the first indication information in the second preset time interval, where the second response information is configured to indicate that the mobile terminal fails to receive all of the set of m data blocks, and the number in is a positive integer either less than or equal to the number of data blocks of the second upgrade file.

in detail, the mobile terminal transmits second response information to the adapter after the mobile terminal receives the set of m data blocks, where the number m is a positive integer. For example, the mobile terminal transmits one piece of second response information to the adapter after the mobile terminal receives a data block. The mobile terminal does not transmit second response information to the adapter if the mobile terminal does not receive the data block in a second preset time interval. In another embodiment, the mobile terminal transmits second response information to the adapter after the mobile terminal receives a plurality of data blocks, where the second response information indicates that the mobile terminal receives the set of m data blocks. Either one piece of second response information indicates that the mobile terminal receives the set of m data blocks or m piece of second response information correspondingly indicates that the mobile terminal receives the set of m data blocks respectively.

In at least one embodiment, the mobile terminal transmits second response information to the adapter after the mobile terminal receives the set of m data blocks, where the second response information indicates that the mobile terminal receives the set of m data blocks. In one case, if the adapter only transmits the set of m data blocks to the mobile terminal, the adapter determines that the mobile terminal has successfully received the set of m data blocks responsive to the second response information and the adapter continuously transmits the remaining data blocks of the second upgrade file. In another case, if the adapter transmits the number of data blocks, which is greater than m, to the mobile terminal, the adapter determines that the mobile terminal only receives the set of m data blocks responsive to the second response information. Thus, since the mobile terminal loses some data blocks, the adapter does not transmit the second upgrade file to the mobile terminal again and thus, upgrading the firmware of the adapter fails. Meanwhile, if the mobile terminal does not receive data blocks in a time interval, the mobile terminal determines that upgrading the firmware of the adapter fails.

In at least one embodiment, the mobile terminal compares the received second upgrade file with the first upgrade file. In one case, when the mobile terminal receives a portion of second upgrade file, the portion of second upgrade file is compared to a portion of first upgrade file correspondingly. In another case, when the mobile terminal receives all of the second upgrade file, the all second upgrade file is compared to the first upgrade file. For example, when the adapter completely transmits all of the second upgrade file and receives the second response information transmitted by the mobile terminal, the adapter transmits third indication information to the mobile terminal, where the third indication information indicates that the adapter completely transmits all of the second upgrade file.

In at least one embodiment, the mobile terminal compares the second upgrade file with the first upgrade file and transmits second indication information to the adapter. If the second upgrade file is the same as the first upgrade file, the mobile terminal determines that upgrading the firmware of the adapter succeeds responsive to the second indication information. If the second upgrade file is different from the first upgrade file, the mobile terminal determines that upgrading the firmware of the adapter fails responsive to the second indication information. When the adapter receives the second indication information, the adapter confirms that upgrading the firmware fails and cancels the received first upgrade file (i.e., second upgrade file). The adapter then exits upgrading the firmware to wait for a next updating procedure. The mobile terminal re-sends new upgrade file to the adapter.

Thus, in upgrading the firmware of the adapter, after the mobile terminal transmits the upgrade file to the adapter and the adapter receives the upgrade file having the predetermined size, the adapter transmits response information to the mobile terminal. When the adapter does not receive the upgrade file and the mobile terminal does not receive the response information, upgrading the firmware of the adapter fails and the mobile terminal re-transmits the upgrade file. Moreover, after the mobile terminal transmits the upgrade file to the adapter, the adapter re-transmits the received upgrade file to the mobile terminal and the mobile terminal compares the received upgrade file and the transmitted upgrade file to determine whether the upgrade file is correctly transmitted. If the upgrade file is incorrect, the mobile terminal re-transmits the upgrade file. Therefore, a data transmission error resulting in malfunction of the adapter can be avoided when performing upgrading the firmware of the adapter such that the accuracy and reliability of a data transmission are improved when the mobile terminal transmits data to the adapter.

Figure 2:
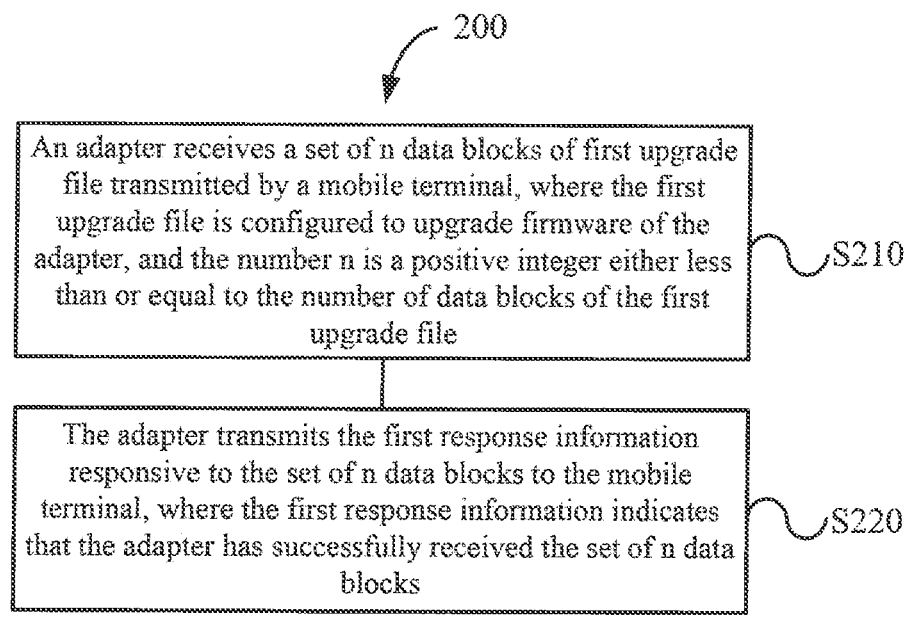
FIG. 2 is an illustrative flowchart of a method for upgrading firmware of the adapter according to another embodiment of the present disclosure.

FIG. 2 is an illustrative flowchart of a method 200 for upgrading firmware of the adapter according to another embodiment of the present disclosure. The adapter is configured to perform the method 200, where the adapter includes an MCU. As illustrated in FIG. 2, the method 200 includes the following blocks.

In block S210, the adapter receives a set of n data blocks of first upgrade file transmitted by a mobile terminal, where the first upgrade file is configured to upgrade firmware of the adapter, and the number n is a positive integer either less than or equal to the number of data blocks of the first upgrade file.

In block S220, the adapter transmits the first response information responsive to the set of n data blocks to the mobile terminal, where the first response information indicates that the adapter has successfully received the set of n data blocks.

Thus, in upgrading the firmware of the adapter, after the mobile terminal transmits the upgrade file to the adapter and the adapter receives the upgrade file having a predetermined size, the adapter transmits determination information to the mobile terminal. When the adapter does not receive the upgrade file and the mobile terminal does not receive the determination information, upgrading the firmware of the adapter fails and the mobile terminal re-transmits upgrade file to the adapter so that a data transmission error resulting in malfunction of the adapter is avoided when performing upgrading the firmware of the adapter. Therefore, accuracy and reliability of a data transmission are improved when the mobile terminal transmits data to the adapter.

It can be understood that, in at least one embodiment, the adapter includes an MCU and the MCU can be coupled to an MCU of the mobile terminal. For example, the mobile terminal (e.g., a smartphone) downloads data to the adapter via a connection port of the smartphone to upgrade the firmware of the MCU in the adapter.

In block S210, the adapter receives the set of n data blocks of the first upgrade file transmitted by the mobile terminal, where the first upgrade file is configured to upgrade firmware of the adapter, and the number n is a positive integer either less than or equal to the number of data blocks of the first upgrade file. In at least one embodiment, when the adapter communicates with the mobile terminal, the adapter transmits version information to the mobile terminal such that the mobile terminal is capable of comparing the version information of the adapter to determine whether the adapter should be upgraded or not. If the adapter should be upgraded, the mobile terminal transmits the upgrade file to the adapter.

In detail, when the adapter makes a communication with the mobile terminal, the adapter transmits the version information indicating a current version of adapter, to the mobile terminal. The mobile terminal compares the version information with prestored version information, where the prestored version information is the latest version of the adapter stored in the mobile terminal. If the version information fed back from the adapter is lower than the prestored version information, the mobile terminal transmits updating indication information to indicate a need to upgrade firmware of the adapter. The adapter prepares to be upgraded on the basis of the updating indication information by receiving the upgrade file transmitted from the mobile terminal.

For example, the version information may be a version number and the adapter transmits a current version number to the mobile terminal, where the prestored version information in the mobile terminal is the latest version number stored in the mobile terminal. If the current version number of adapter is lower than the latest version number, it is required to upgrade firmware of the adapter.

In block S220, the adapter transmits the first response information responsive to the set of n data blocks to the mobile terminal, where the first response information indicates that the adapter has successfully received the set of n data blocks. In one case, the adapter transmits one piece of the first response information where the first response information indicates that the adapter has successfully received all of the set of n data blocks. In another case, the adapter transmits n pieces of the first response information where each piece of the first response information corresponds to one mobile terminal.

In at least one embodiment, the adapter can skip transmitting the first response information to the mobile terminal, and determines that upgrading the firmware of the adapter fails when the adapter does not receive data blocks of the first upgrade file in a first preset time interval. Furthermore, the mobile terminal also does not transmit data blocks to the adapter continuously and determines that upgrading the firmware of the adapter fails if the mobile terminal fails to receive first response information. For example, if the adapter only receives the set of n data blocks in the first preset time interval, the adapter transmits the first response information to the mobile terminal, where the first response information indicates that the adapter merely receives the set of n data blocks. Since the mobile terminal transmits more data blocks greater than the number n, the adapter does not receive all of the data blocks from the mobile terminal and the mobile terminal determines that upgrading the firmware of the adapter tails and does not transmit data blocks to the adapter. Similarly, the adapter cannot receive data blocks in the first preset time interval and determines upgrading the firmware of the adapter to be failed.

In at least one embodiment, the adapter receives the set of n data blocks of first upgrade file transmitted by a mobile terminal, where the number n is a positive integer either less than or equal to the number of data blocks of the first upgrade file. For example, if n is equal to one, the mobile terminal transmits the set of n data blocks of the first upgrade file one by one. When the adapter receives one of data blocks and the adapter transmits the first response information corresponding to the one data block to the mobile terminal, the mobile terminal continuously transmits a next data block to the adapter. If the adapter does not receives a data block from the mobile terminal in the preset time interval, the adapter does not transmits the first response information and determines that upgrading the firmware of the adapter fails.

In another example, if n is equal to three, the mobile terminal transmits the set of n data blocks of the first upgrade file in three data blocks per unit, where the first response information transmitted by the adapter is capable of indicating whether the adapter receives the three data blocks per unit. For example, either one piece of first response information indicates the reception of three data blocks or three pieces of first response information indicate the receptions of three data blocks respectively. If the adapter only receives a portion of three data blocks, either the adapter does not transmit the first response information to the mobile terminal or the adapter transmits the first response information to the mobile terminal, which indicates that a portion of data blocks are received. Thus, the mobile terminal is capable of determining that upgrading the firmware of the adapter fails and does not transmit data blocks again.

In at least one embodiment, the mobile terminal transmits the set of n data blocks to the adapter, where the number n is a positive integer either less than or equal to the number of data blocks of the first upgrade file, and a size of each data block can be set according to actual circumstances. For example, one byte or a plurality of bytes can be defined as the size of each data block. If the size of each data block is one byte, the mobile terminal waits for the first response information having the one byte from the adapter after transmitting every one data block having one byte to the adapter. If the adapter receives the data block in the preset time interval, the adapter transmits the first response information to the mobile terminal and the mobile terminal continuously transmits remaining data blocks to the adapter. If the adapter does not receive the data block in the preset time interval, the adapter determines that upgrading the firmware of the adapter fails and does not transmit the first response information to the mobile terminal. Thus, the mobile terminal determines that upgrading the firmware of the adapter fails and stops transmitting data blocks since the mobile terminal does not receive the first response information.

In at least one embodiment, if the size of each data block is still one byte, the mobile terminal waits for the first response information from the adapter after transmitting a plurality of data blocks (i.e., a plurality of bytes) to the adapter. Either if the adapter does not receive the data blocks or receives a portion of data blocks, the mobile terminal determines that upgrading the firmware of the adapter fails since either the mobile terminal does not receive the first response information from the adapter or if the mobile terminal receives the first response information which indicates that the adapter does not receive all of the bytes of data blocks. If the adapter has successfully received all of the data blocks in the preset time interval, the adapter transmits the first response information to the mobile terminal to indicate that the adapter has successfully received all of the data blocks. The mobile terminal then continuously transmits remaining data blocks to the adapter responsive to the first response information.

In at least one embodiment, when the mobile terminal determines that the adapter receives the set of n data blocks of first upgrade file the mobile terminal continuously transmits the remaining data blocks of first upgrade file to the adapter until the mobile terminal transmits all of the remaining data blocks which means that the mobile terminal completely transmits the first upgrade tile. In detail, when the mobile terminal continuously transmits data blocks of first upgrade file to the adapter and the mobile terminal receives the first response information of the adapter, which indicates that the adapter has successfully received the data blocks, the mobile terminal transmits first indication information to the adapter while the mobile terminal completely transmits the first upgrade file to the adapter, where the first indication information means that the mobile terminal has completely transmitted the first upgrade file to the adapter. If the adapter receives the first indication information, the adapter transmits second upgrade file to the mobile terminal, where the second upgrade file is the received first upgrade file from the mobile terminal. The mobile terminal compares the second upgrade file with the first upgrade file to determine whether the adapter correctly receives the upgrade file.

In at least one embodiment, the adapter transmits the set of m data blocks of second upgrade file responsive to first indication information. The mobile terminal transmits second response information to the adapter based on the received data blocks and the adapter determines the adapter continuously transmits the rest of the second upgrade file to the mobile terminal according to the second response information. In detail, after the adapter transmits the set of m data blocks of second upgrade file to the mobile terminal and if the adapter does not receive the second response information in the second preset time interval or if the received second response information indicates that the mobile terminal does not receive all of the set of m data blocks, the adapter determines that upgrading the firmware of the adapter fails. The adapter does not transmit the second upgrade file to the mobile terminal, cancel the received the first upgrade file, and withdraw upgrading the firmware of the adapter. If the adapter receives the second response information which indicates that the mobile terminal receives all of the set of m data blocks, the adapter continuously transmits the remaining data blocks of the second upgrade file until the second upgrade file is completely transmitted.

In at least one embodiment, the number m is a positive integer either less than or equal to the number of data blocks of the second upgrade file. For example, if in is equal to one, the adapter waits to receive second response information when the adapter transmits the set of m data blocks of the second upgrade file one by one. In another example, if in is equal to three, the adapter waits to receive the second response information of the three data blocks when the adapter transmits the set of m data blocks of the second upgrade file in three data blocks per unit. A size of each data block can be set according to actual circumstances. For example, the size of each data block is set as one byte, but not limited. If the adapter transmits the second upgrade file, the adapter transmits third indication information to the mobile terminal, where the third indication information indicates that the adapter completely transmits the second upgrade file. The mobile terminal compares the received second upgrade file with the first upgrade file and transmits second indication information to the adapter responsive to the comparison result.

In at least one embodiment, if the second indication information received by the adapter indicates a successful updating procedure of the adapter and the second upgrade file is the same as the first upgrade file, the mobile terminal determines that upgrading the firmware of the adapter succeeds responsive to the second indication information.

If the second indication information received by the adapter indicates that upgrading the firmware of the adapter fails and the second upgrade file is different from the first upgrade file, the mobile terminal determines that upgrading the firmware of the adapter fails responsive to the second indication information. The adapter then can cancel the received first upgrade file and wait to receive upgrade file from the mobile terminal.

It should be noted that the above-mentioned embodiments of methods are depicted in a series of operations with a simplified description. However, it can be understood that, in an embodiment of the present disclosure, the operations of the present disclosure are descriptive rather than limiting of the sequence of the operations because some operations can be sequentially or simultaneously performed on the basis of the functions or logics of operations. It can be understood that, in an embodiment of the present disclosure, the foregoing embodiments are depicted as preferred embodiments and thus the related operations and units are not necessarily implements in the present disclosure.

Thus, in upgrading the firmware of the adapter, after the mobile terminal transmits the upgrade file to the adapter and the adapter receives the upgrade file having the predetermined size, the adapter transmits response information to the mobile terminal. When the adapter does not receive the upgrade file and the mobile terminal does not receive the response information, upgrading the firmware of the adapter fails and the mobile terminal re-transmits the upgrade file. Moreover, after the mobile terminal transmits the upgrade tile to the adapter, the adapter re-transmits the received upgrade file to the mobile terminal and the mobile terminal compares the received upgrade file and the transmitted upgrade file to determine whether the upgrade file is correctly transmitted. If the upgrade file is incorrect, the mobile terminal re-transmits the upgrade file. Therefore, a data transmission error resulting in malfunction of the adapter can be avoided when performing upgrading the firmware of the adapter such that the accuracy and reliability of a data transmission are improved when the mobile terminal transmits data to the adapter.

By accompanying FIG I with FIG. 2 in the above embodiments, the method for upgrading firmware of the adapter based on the mobile terminal and adapter are described. The method for upgrading firmware of the adapter responsive to the interactions between devices will be introduced briefly by FIG. 3 in the following.

Figure 3:
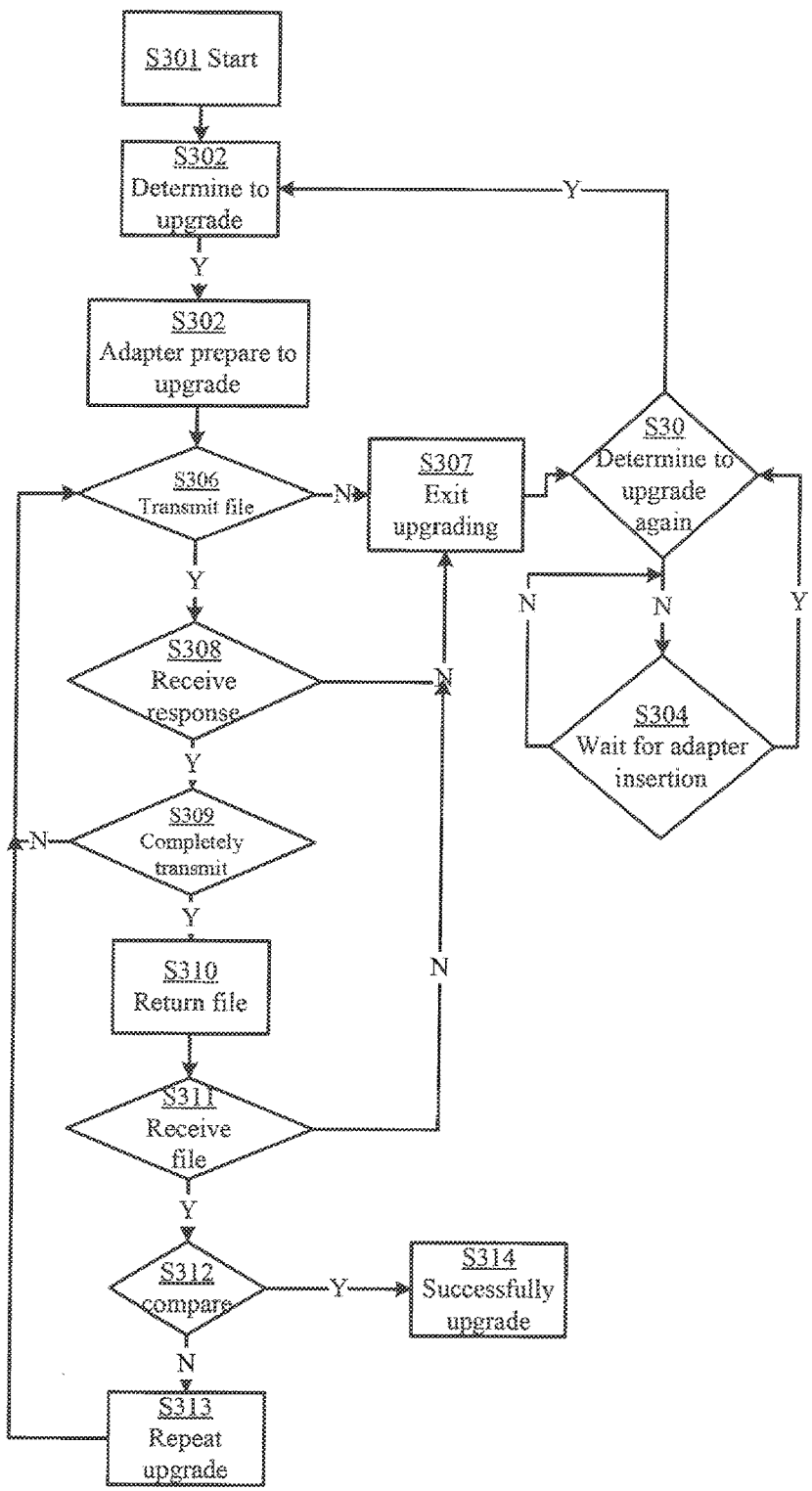
FIG. 3 is still an illustrative flowchart of a method for upgrading firmware of the adapter according to another embodiment of the present disclosure.

FIG. 3 is an illustrative flowchart of a method for upgrading firmware of the adapter according to still another embodiment of the present disclosure.

In block S301, the adapter starts to make a communication with a mobile terminal.

In block S302, the adapter transmits version information to the mobile terminal and the mobile terminal compares the version information with prestored version information. For example, the version information may be a version number and the mobile terminal compares the version number with prestored version number. If the version number of the adapter is lower than the prestored version number, the mobile terminal determines that it is required to upgrade firmware of the adapter and proceed to block S305. If the version number of the adapter is the same as the prestored version number, the mobile terminal determines that it is not required to upgrade firmware of the adapter and proceed to block S303.

In block S303, the mobile terminal identifies the version number of the adapter again to determine whether the adapter needs to be upgraded. If it is required to upgrade firmware of the adapter, proceed to block S302. If it is not required to upgrade firmware of the adapter, proceed to block S304.

In block S304, the mobile terminal waits to communicate with the adapter again until the adapter is inserted to the mobile terminal and proceeds to block S303.

In block S305, the adapter receives updating indication information transmitted by the mobile terminal for preparing upgrading the firmware of the adapter. In other words, the adapter prepares to receive the upgrade file transmitted from the mobile terminal.

In block S306, the adapter receives first upgrade file transmitted by the mobile terminal, where the first upgrade file is configured to upgrade firmware of the adapter. For example, after the adapter receives data block having one byte, the adapter is capable of transmitting first response information to the mobile terminal. If the adapter does not receive the data blocks of the first upgrade file transmitted by mobile terminal in a preset time interval, proceed to block S307. If the adapter receives the data blocks having one byte, proceed to block S308.

In block S307, if upgrading the firmware of the adapter fails, the mobile terminal and adapter exits an updating mode. The adapter can cancel the received first upgrade file and proceed to block S303.

In block S308, the adapter transmits the first response information to the mobile terminal, where the first response information indicates that the adapter has successfully received the data block having one byte. If the mobile terminal receives the first response information in the preset time interval, proceed to block S309. If the mobile terminal does not receive the first response information in the preset time interval, proceed to block S307.

In block S309, after the mobile terminal receives the first response information, the mobile terminal determines whether the mobile terminal completely transmits the first upgrade file. If the mobile terminal does not completely transmit the first upgrade file, the mobile terminal continuously transmits the first upgrade file and proceeds block S306. If the mobile terminal determines that the first upgrade file have no remaining data, the mobile terminal completely transmits the first upgrade file and proceeds to block S310.

In block S310, the mobile terminal transmits first indication information to the adapter, where the first indication information completely transmits the first upgrade file to adapter so that the adapter returns the received first upgrade file to the mobile terminal responsive to the first indication information.

In block S311, the mobile terminal receives second upgrade file transmitted by the adapter, where the second upgrade file is the received first upgrade file. In at least one embodiment, the process of transmitting the second upgrade file from the adapter to the mobile terminal is similar to the process of transmitting the first upgrade file from the mobile terminal to the adapter. In detail, when the mobile terminal receives each data block having one byte, the mobile terminal transmits second response information to the adapter. After the adapter receives the second response information, the adapter continuously transmits second upgrade file to the mobile terminal until the second upgrade file is transmitted completely. The adapter then transmits second indication information to the mobile terminal and proceeds to block S312, where the second indication information indicates that the adapter completely transmits the second upgrade file to the mobile terminal completely. If the mobile terminal does not receive the second upgrade file in the preset time interval, the mobile terminal does not transmit second response information to the adapter. When the adapter does not receive the second response information, the adapter can stop transmitting the second upgrade file and upgrading the firmware of the adapter fails before proceeding to block S307.

In block S312, after the mobile terminal receives the second upgrade file completely, the mobile terminal compares the second upgrade file with the first upgrade file and the mobile terminal transmits third indication information to the adapter responsive to the compared result. If the second upgrade file is the same as the first upgrade file, block S314 is performed. If the second upgrade file is different from the first upgrade file, proceed to block S313.

In block S313, if the mobile terminal transmits the third indication information to adapter where the third indication information indicates that upgrading the firmware of the adapter fails, upgrading the firmware of the adapter is repeated again.

In block S314, if the mobile terminal transmits the third indication information to adapter where the third indication information indicates that upgrading the firmware of the adapter succeeds, upgrading the firmware of the adapter is complete.

It should be noted that the above-mentioned embodiments of methods are depicted in a series of operations with a simplified description. However, it can be understood that, in an embodiment of the present disclosure, the operations of the present disclosure are descriptive rather than limiting of the sequence of the operations because some operations can be sequentially or simultaneously performed on the basis of the functions or logics of operations. It can be understood that, in an embodiment of the present disclosure, the foregoing embodiments are depicted as preferred embodiments and thus the related operations and units are not necessarily implements in the present disclosure.

Thus, in upgrading the firmware of the adapter, after the mobile terminal transmits the upgrade file to the adapter and the adapter receives the upgrade file having the predetermined size, the adapter transmits response information to the mobile terminal. When the adapter does not receive the upgrade file and the mobile terminal does not receive the response information, upgrading the firmware of the adapter fails and the mobile terminal re-transmits the upgrade file. Moreover, after the mobile terminal transmits the upgrade file to the adapter, the adapter re-transmits the received upgrade file to the mobile terminal and the mobile terminal compares the received upgrade file and the transmitted upgrade file to determine whether the upgrade file is correctly transmitted. If the upgrade file is incorrect, the mobile terminal re-transmits the upgrade file. Therefore, a data transmission error resulting in malfunction of the adapter can be avoided when performing upgrading the firmware of the adapter such that the accuracy and reliability of a data transmission are improved when the mobile terminal transmits data to the adapter.

By accompanying FIG. 1 through FIG. 3 in the above embodiments, the method for upgrading firmware of the adapter based on the mobile terminal and adapter are described. The device for upgrading firmware of the adapter in accordance with embodiments of the present disclosure will be briefly introduced by FIGS. 4 through 6 in the following.

Figure 4:
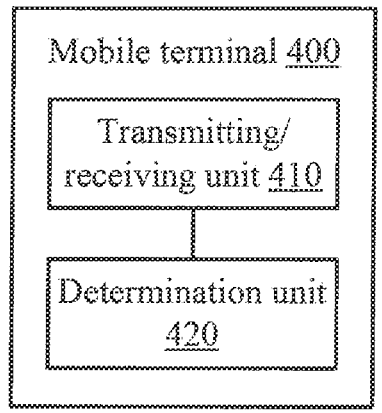
FIG. 4 is an illustrative block diagram of a mobile terminal according to one embodiment of the present disclosure.

As illustrated in FIG. 4, the mobile terminal 400 in at least one embodiment includes a transmitting/receiving unit 410 configured to transmit the set of n data blocks of first upgrade file to an adapter, where the first upgrade file is configured to upgrade firmware of the adapter, and the number n is a positive integer either less than or equal to the number of data blocks of the first upgrade file; the transmitting/receiving unit 410 is configured to receive first response information which is transmitted by the adapter based on the set of n data blocks; and a determination unit (e.g., a processor) 420 configured to determine that upgrading the firmware of the adapter fails when the first response information indicates that the adapter does not receive all of the set of n data blocks.

Thus, the mobile terminal of the present disclosure transmits the upgrade file to the adapter and the adapter sends determination information to the mobile terminal after the adapter receives the upgrade file having a predetermined size. If the mobile terminal does not receive the determination information or the adapter does not receive the upgrade file, upgrading the firmware fails. Therefore, a data transmission error resulting in malfunction of the adapter can be avoided when performing upgrading the firmware of the adapter such that the accuracy and reliability of a data transmission are improved when the mobile terminal transmits data to the adapter.

In at least one embodiment, after the transmitting/receiving unit 410 transmits the set of n data blocks of the first upgrade file to the adapter in a first preset time interval, the determination unit 420 is configured to determine that upgrading the firmware of the adapter fails when the mobile terminal does not receive the first response information.

In at least one embodiment, the transmitting/receiving unit 410 is configured to transmit the ith data block of the set of n data blocks to the adapter, where the number i is a positive integer less than the number n, and the transmitting/receiving unit 410 is further configured to continuously transmit the (i+1)th data block to the adapter when the mobile terminal receives the first response information which is transmitted by the adapter responsive to the ith data block, where the determination unit 420 determines that upgrading the firmware of the adapter fails responsive to the first response information when the determination unit 410 does not receive the first response information which is transmitted by the adapter responsive to the ith data block.

In at least one embodiment, when the first response info illation indicates that the adapter has successfully received all of the set of n data blocks, the transmitting/receiving unit 410 is further configured to continuously transmit remaining data blocks of the first upgrade file to the adapter if the determination unit 420 determines that the first upgrade file includes the remaining data blocks, and to transmit first indication information to the adapter if the determination unit 420 determines that the first upgrade file is completely transmitted, where the first indication information indicates that the mobile terminal completely transmits the first upgrade file.

In at least one embodiment, the transmitting/receiving unit 410 is configured to either transmit second response information to the adapter when the set of m data blocks of second upgrade file, which are transmitted by the adapter responsive to the first indication information in a second preset time interval, are received, where the second response information is configured to indicate that the mobile terminal has successfully received the the set of m data blocks, and the second upgrade file is the same as the previous first upgrade file received by the adapter, or to transmit the second response information to the adapter and determine, by the determination unit 420, that upgrading the firmware of the adapter fails when all of the set of m data blocks of the second upgrade file which are transmitted by the adapter responsive to the first indication information in the second preset time interval are not received, where the second response information is configured to indicate that the mobile terminal fails to receive all of the set of m data blocks, and the number in is a positive integer either less than or equal to the number of data blocks of the second upgrade file.

In at least one embodiment, the transmitting/receiving unit 410 is configured to skip transmitting the second response information to the adapter when all of the set of m data blocks of the second upgrade file, which are transmitted by the adapter responsive to the first indication information in the second preset time interval, are not received.

In at least one embodiment, a value of m is equal to one.

In at least one embodiment, the determination unit 420 is further configured to compare the second upgrade file with the first upgrade file, and the transmitting/receiving unit 410 is configured to transmit the second indication information to the adapter, where if the second upgrade file is the same as the first upgrade file, the second indication information is configured to indicate upgrading the firmware of the adapter to be complete, and if the second upgrade file is different from the first upgrade file, the second indication information is configured to indicate upgrading the firmware of the adapter to be incomplete.

In at least one embodiment, before the determination unit 420 compares the second upgrade file with the first upgrade file, the transmitting/receiving unit 410 is configured to receive a third indication information which is transmitted by the adapter, where the third indication information indicates that the adapter completely transmits the second upgrade file.

In at least one embodiment, the transmitting/receiving unit 410 is configured to re-transmit the first upgrade file to the adapter if the determination unit 420 determines that upgrading the firmware of the adapter fails.

In at least one embodiment, the transmitting/receiving unit 410 is configured to receive version information fed back from the adapter before the first upgrade file is transmitted to the adapter, and the determination unit 420 is configured to compare the version information with pre-stored version information, where if the version information fed back from the adapter is lower than the prestored version information stored in the transmitting/receiving unit 420, the transmitting/receiving unit 420 transmits an updating indication information to indicate a need to upgrade firmware of the adapter.

It should be noted that the mobile terminal 400 is capable of performing the method 100 correspondingly in the present disclosure. Furthermore, the operations and/or functions described in the units of the mobile terminal 400 correspond to the blocks depicted in FIG. 1. For the sake of brevity, it will not be repeated here.

Thus, in the mobile terminal of the present disclosure, after the mobile terminal transmits the upgrade file to the adapter and the adapter receives the upgrade file having the predetermined size, the adapter transmits response information to the mobile terminal. When the adapter does not receive the upgrade file and the mobile terminal does not receive the response information, upgrading the firmware of the adapter fails and the mobile terminal re-transmits the upgrade file. Moreover, after the mobile terminal transmits the upgrade file to the adapter, the adapter re-transmits the received upgrade file to the mobile terminal and the mobile terminal compares the received upgrade file and the transmitted upgrade file to determine whether the upgrade file is correctly transmitted. If the upgrade file is incorrect, the mobile terminal re-transmits the upgrade file. Therefore, a data transmission error resulting in malfunction of the adapter can be avoided when performing upgrading the firmware of the adapter such that the accuracy and reliability of a data transmission are improved when the mobile terminal transmits data to the adapter.

Figure 5:
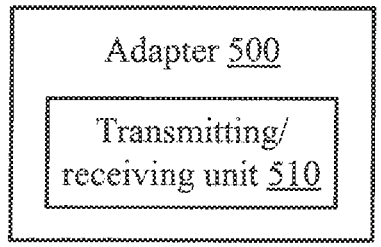
FIG. 5 is an illustrative block diagram of an adapter according to one embodiment of the present disclosure.

As illustrated in FIG. 5, the adapter 500 in at least one embodiment includes a transmitting/receiving unit 510 is configured to receive a set of n data blocks of first upgrade file transmitted by a mobile terminal, where the first upgrade file is configured to upgrade firmware of the adapter, and the number n is a positive integer either less than or equal to the number of data blocks of the first upgrade file; and the transmitting/receiving unit 510 is further configured to transmit first response information based on the set of n data blocks to the mobile terminal, where the first response information indicates that the adapter has successfully received the set of n data blocks.

Thus, the adapter receives the upgrade file transmitted by the mobile terminal and the adapter sends determination information to the mobile terminal after the adapter receives the upgrade file having a predetermined size. If the mobile terminal does not receive the determination information or the adapter does not receive the upgrade file, upgrading the firmware fails. Therefore, a data transmission error resulting in malfunction of the adapter can be avoided when performing upgrading the firmware of the adapter such that the accuracy and reliability of a data transmission are improved when the mobile terminal transmits data to the adapter.

Figure 6:
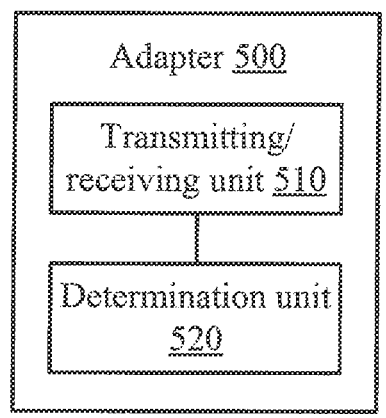
FIG. 6 is an illustrative block diagram of an adapter according to another embodiment of the present disclosure.

In at least one embodiment of FIG. 6, the adapter further includes a determination unit 520 configured to skip transmitting the first response information to the mobile terminal, and determine that upgrading the firmware of the adapter fails when the transmitting/receiving unit 510 does not receive data blocks of the first upgrade file in a first preset time interval.

In at least one embodiment, the transmitting/receiving unit 510 is further configured to receive first indication information which is transmitted by the mobile terminal, where the first indication information indicates that the mobile terminal completely transmits the first upgrade file, to transmit the set of m data blocks of second upgrade file to the mobile terminal, where the second upgrade file is the first upgrade file which is transmitted from the mobile terminal to the adapter, and the number in is a positive integer either less than or equal to the number of data blocks of the second upgrade file, and to receive second response information which is transmitted by the mobile terminal based on the set of m data blocks, and the determination unit 520 is configured to determine that upgrading the firmware of the adapter fails if the second response information indicates that the mobile terminal does not receive all of the set of n data blocks.

In at least one embodiment, the determination unit 520 is configured to determine that upgrading the firmware of the adapter fails when the adapter transmits the set of m data blocks to the mobile terminal in a second preset time interval and the transmitting/receiving unit 510 does not receive the second response information.

In at least one embodiment, the second response information indicates that the mobile terminal has successfully received the set of m data blocks, and the transmitting/receiving unit 510 is configured to continuously transmit remaining data blocks of the second upgrade file to the mobile terminal if the determination unit 520 determines the second upgrade file includes the remaining data blocks; and transmit third indication information to the mobile terminal if the determination unit 520 determines that the second upgrade file is completely transmitted, where the third indication information indicates that the adapter completely transmits the second upgrade file.

In at least one embodiment, the transmitting/receiving unit 510 is configured to receive second indication information transmitted by the mobile terminal based on the second upgrade file, where the second indication information indicates that upgrading the firmware of the adapter either fails or succeeds.

In at least one embodiment, the determination unit 520 is configured to cancel received data blocks of the first upgrade file if upgrading the firmware of the adapter fails.

In at least one embodiment, the transmitting/receiving unit 510 is configured to transmit version information to the mobile terminal before the first upgrade file transmitted by the mobile terminal is received, where the version information indicates a current version of the adapter, and to receive updating indication information transmitted by the mobile terminal, where the updating indication information indicates a need to upgrade firmware of the adapter.

it should be noted that the adapter 500 is capable of performing the method 200 correspondingly in the present disclosure. Furthermore, the operations and/or functions described in the units of the adapter 500 correspond to the blocks depicted in FIG. 2. For the sake of brevity, it will not be repeated here.

Thus, in the adapter of the present disclosure, after the adapter receives the upgrade file transmitted by the mobile terminal and the adapter receives the upgrade file having a predetermined size, the adapter transmits response information to the mobile terminal. When the adapter does not receive the upgrade file in a preset time interval and the mobile terminal does not receive the response information, upgrading the firmware of the adapter fails and the mobile terminal re-transmits the upgrade file. Moreover, after the mobile terminal transmits the upgrade file to the adapter, the adapter re-transmits the received upgrade file to the mobile terminal and the mobile terminal compares the received upgrade file and the transmitted upgrade file to determine whether the upgrade file is correctly transmitted. If the upgrade file is incorrect, the mobile terminal re-transmits the upgrade file. Therefore, a data transmission error resulting in malfunction of the adapter can be avoided when performing upgrading the firmware of the adapter such that the accuracy and reliability of a data transmission are improved when the mobile terminal transmits data to the adapter.

It can be understood that, in an embodiment of the present disclosure, the units and methods of the present disclosure can be implemented by electronic hardware, computing software and the combination thereof b based on conditions of application and design fields. Some embodiments of the present disclosure further provide a computer storage media which stores programs to implement all or partial blocks of the methods described in some embodiments of the disclosure. Illustratively, the above-mentioned embodiments of methods are depicted in a series of operations with a simplified description. However, it can be understood that, in an embodiment of the present disclosure, the operations of the present disclosure are descriptive rather than limiting of the sequence of the operations because some operations can be sequentially or simultaneously performed. It can be understood that, in an embodiment of the present disclosure, the foregoing embodiments are depicted as preferred embodiments and thus the related operations and units are not necessarily implements in the present disclosure.

It can be understood that, in an embodiment of the present disclosure, the implement of above-mentioned system, devices and units can be referred to the methods correspondingly. For the sake of brevity and convenience, it will not be repeated here.

In some embodiments of the present disclosure, it should be noted that the described devices can be implemented by different components. For example, some embodiments of above-described devices are illustrated where the unit division is based on logical function and while implementing at least one embodiment, the unit division is basis on different ways. For example, a plurality of units or members can be combined together or integrated to another system, or some features may be ignore or are not performed. Furthermore, the above-described coupling, direct couple or communication connection statuses between interactions are implemented by interfaces. The indirect coupling or communication connection between devices or units is in electrical, mechanical or other statuses.

The separation of components is or is not a physically independent status. The display unit can be or is not a physical unit. In other words, the display unit may be disposed one place or arranged in network units. Based on requirement, a portion of units or all of the units are configured to implement the technical schemes of the present disclosure.

Moreover, functional units in some embodiments of the present disclosure are integrated to a processing unit or each functional unit is installed independently.

If the above-mentioned integrated units are implemented by software functional components and serve as independent products for sale or usage, the integrated units are stored in computer readable storage media. Based on the descriptions of embodiments, it can be understood that, in an embodiment of the present disclosure, all or partial of the technical schemes of the present disclosure can be performed by software products, hardware products, firmware products and the combinations. The software products of a computer are stored in storage media and include a plurality of instructions to allow at least one computing device to execute all or partial functions of the method where the computing device is selected from a group including a personal computer, a server and network device. For example, the storage media are selected from USB disk, portable hard disk drive, Random Access Memory (RAM), Read-Only Memory (ROM), Electrically Erasable Programmable Read-Only Memory (EEPROM), Compact Disc Read-Only Memory (CD-ROM) or other kinds of disc storages, magnetic storage media or other magnetic storage device, and media of which program codes with portable stored instructions or data can be accessed by the computer to execute at least one application program for performing above-mentioned method.

As is understood by persons skilled in the art, the foregoing preferred embodiments of the present disclosure are illustrative rather than limiting of the present disclosure. It is intended that they cover various modifications and similar arrangements be included in the spirit and scope of the present disclosure, the scope of which should be accorded the broadest interpretation so as to encompass all such modifications and similar structures.

What is claimed is:

1. A method for upgrading firmware of an adapter, the method comprising:
   transmitting, by a mobile terminal, a set of n data blocks of a first upgrade file to the adapter, wherein the first upgrade file is configured to upgrade the firmware of the adapter, and the number n is a positive integer either less than or equal to a total number of data blocks of the first upgrade file;
   receiving, by the mobile terminal, a first response information fed back from the adapter responsive to the data block transmission; and
   determining, by the mobile terminal, that upgrading the firmware of the adapter fails when the first response information fed back from the adapter indicates that the adapter fails to receive all of the set of n data blocks of the first upgrade file;
   re-transmitting, by the mobile terminal, the first upgrade file to the adapter based on the first response information if the mobile terminal determines that upgrading the firmware of the adapter fails when a data transmission error of the set of n data blocks of the first upgrade file is detected.

2. The method of claim 1, wherein after transmitting, by the mobile terminal, the set of n data blocks of the first upgrade file to the adapter, the method further comprises:
   determining, by the mobile terminal, that upgrading the firmware of the adapter fails when the mobile terminal does not receive the first response information in a first preset time interval.

3. The method of claim 2, wherein transmitting, by the mobile terminal, the set of n data blocks of the first upgrade file to the adapter comprises:
   transmitting, by the mobile terminal, the ith data block of the set of n data blocks to the adapter, wherein the number i is a positive integer less than the number n; and
   the method further comprises:
   continuously transmitting, by the mobile terminal, the (i+1)th data block to the adapter when the mobile terminal receives the first response fed back from the adapter responsive to the ith data block transmission, wherein the first response information is configured to indicate that the adapter receives the ith data block of the first upgrade file; and
   determining, by the mobile terminal, that upgrading the firmware of the adapter fails when the mobile terminal does not receive the first response information.

4. The method of claim 1, wherein when the first response information indicates that the adapter successfully receives all of the set of n data blocks of the first upgrade file, the method further comprises:
   when the number n is a positive integer either less than the total number of data blocks of the first upgrade file, continuously transmitting remaining data blocks of the first upgrade file by the mobile terminal to the adapter; and
   if the first upgrade file has been sent by the mobile terminal, sending a first indication information by the mobile terminal to the adapter.

5. The method of claim 4, wherein the method further comprises:
   sending, by the mobile terminal, a second response information to the adapter when the mobile terminal receives a set of m data blocks of a second upgrade file which is re-sent by the adapter responsive to the first indication information in a second preset time interval, wherein the second response information is configured to indicate that the mobile terminal has successfully received the set of m data blocks of the second upgrade file, and the second upgrade file is the same as the previous first upgrade file received by the adapter; or sending, by the mobile terminal, the second response information to the adapter when the mobile terminal determines that upgrading the firmware of the adapter fails in the second preset time interval, wherein the second response information is configured to indicate that the mobile terminal fails to receive all of the set of m data blocks of the second upgrade file, and the number m is a positive integer either less than or equal to a total number of data blocks of the second upgrade file.

6. The method of claim 5, wherein the method further comprises:

sending, by the mobile terminal, the second response information to the adapter unless the mobile terminal has not received all of the set of m data blocks of the second upgrade file re-sent by the adapter responsive to the first indication information in the second preset time interval.

7. The method of any one of claim 5, wherein the method further comprises:

comparing, by the mobile terminal, the second upgrade file with the first upgrade file; and sending, by the mobile terminal, the second indication information to the adapter;

wherein if the second upgrade file is the same as the first upgrade file, the second indication information is configured to indicate that upgrading the firmware of the adapter has been completed, and if the second upgrade file differs from the first upgrade file, the second indication information is configured to indicate that upgrading the firmware of the adapter fails.

8. The method of claim 7, wherein before comparing, by the mobile terminal, the second upgrade file and the first upgrade file, the method further comprises:

receiving, by the mobile terminal, a third indication information which is sent by the adapter, wherein the third indication information indicates that the adapter has transmitted the second upgrade file.

9. The method of claim 1, wherein before the mobile terminal transmits the first upgrade file to the adapter, the method further comprises:

receiving, by the mobile terminal, a version information fed back from the adapter;

comparing, by the mobile terminal, the version information with a latest version information prestored in the mobile terminal;

when the version information fed back from the adapter is lower than the latest version information prestored in the mobile terminal, the mobile terminal sends an upgrading indication information to the adapter to get ready for receiving the first upgrade file.

10. A mobile terminal, comprising:

a transmitting/receiving unit configured to transmit a set of n data blocks of first upgrade file to an adapter, wherein the first upgrade file is configured to upgrade firmware of the adapter, and the number n is a positive integer either less than or equal to a total number of data blocks of the first upgrade file;

the transmitting/receiving unit further configured to receive a first response information fed back from the adapter responsive to the data block transmission; and a determination unit configured to determine that upgrading the firmware of the adapter fails when the first response information fed back from the adapter indicates that the adapter fails to receive all of the set of n data blocks of the first upgrade file;

wherein the transmitting/receiving unit is configured to:

re-transmit the first upgrade file to the adapter based on the first response information if the mobile terminal determines that upgrading the firmware of the adapter fails when a data transmission error of the set of n data blocks of the first upgrade file is detected.

11. The mobile terminal of claim 10, wherein the determination unit is further configured to determine that upgrading the firmware of the adapter fails when the mobile terminal does not receive the first response information in a first preset time interval after the transmitting/receiving unit transmits the set of n data blocks of the first upgrade file to the adapter.

12. The mobile terminal of claim 11, wherein the transmitting/receiving unit is configured to:

transmit the ith data block of the set of n data blocks to the adapter, wherein the number i is a positive integer less than the number n; and the transmitting/receiving unit is further configured to:

continuously transmit the (i+1)th data block to the adapter when the mobile terminal receives the first response information fed back from the adapter responsive to the ith data block transmission, wherein the determination unit determines that upgrading the firmware of the adapter fails when the determination unit does not receive the first response information fed back from the adapter responsive to the ith data block transmission.

13. The mobile terminal of claim 10, wherein when the first response information indicates that the adapter successfully receives all of the set of n data blocks, the transmitting/receiving unit is further configured to:

continuously transmit remaining data blocks of the first upgrade file to the adapter if the determination unit determines that the first upgrade file comprises the remaining data blocks; and send first indication information to the adapter if the determination unit determines that the first upgrade file has been sent, wherein the first indication information indicates that the mobile terminal completely transmits the first upgrade file.

14. The mobile terminal of claim 13, wherein the transmitting/receiving unit is configured to:

either send a second response information to the adapter when set of m data blocks of a second upgrade file, which is re-sent by the adapter responsive to the first indication information in a second preset time interval, are received, wherein the second response information is configured to indicate that the mobile terminal has successfully received the set of m data blocks, and the second upgrade file is the same as the previous first upgrade file received by the adapter; or send the second response information to the adapter and determine, by the determination unit, that upgrading the firmware of the adapter fails when all of the set of m data blocks of the second upgrade file which are transmitted by the adapter based on the first indication information in the second preset time interval are not received, wherein the second response information is configured to indicate that the mobile terminal fails to receive all of the set of m data blocks, and the number m is a positive integer either less than or equal to a total number of data blocks of the second upgrade file.

15. The mobile terminal of claim 14, wherein the transmitting/receiving unit is configured to:
send the second response information to the adapter unless all of the set of m data blocks of the second upgrade file re-sent by the adapter responsive to the first indication information in the second preset time interval has not been received.

16. The mobile terminal of claim 14, wherein:
the determination unit is further configured to compare the second upgrade file with the first upgrade file; and
the transmitting/receiving unit is configured to send the second indication information to the adapter;
wherein if the second upgrade file is the same as the first upgrade file, the second indication information is configured to indicate that upgrading the firmware of the adapter has been completed, and if the second upgrade file differs from the first upgrade file, the second indication information is configured to indicate that upgrading the firmware of the adapter fails.

17. The mobile terminal of claim 16, wherein before the determination unit compares the second upgrade file with the first upgrade file, the transmitting/receiving unit is further configured to:
receive a third indication information which is sent by the adapter, wherein the third indication information indicates that the adapter completely transmits the second upgrade file.

18. The mobile terminal of claim 10, wherein:
the transmitting/receiving unit is configured to receive a version information fed back from the adapter before the first upgrade file is transmitted to the adapter;
the determination unit is configured to compare the version information with a latest version information; and
when the version information fed back from the adapter is lower than the latest version information prestored in the transmitting/receiving unit, the transmitting/receiving unit sends an upgrading indication information to the adapter to get ready for receiving the first upgrade file.

* * * * *